June 7, 1932. Y. TSUTSUMI 1,861,944
CLINICAL THERMOMETER
Filed June 30, 1931

YOZO TSUTSUMI~
INVENTOR
BY
ATTORNEY

Patented June 7, 1932

1,861,944

UNITED STATES PATENT OFFICE

YOZO TSUTSUMI, OF EBARA GUN, TOKYO FU, JAPAN

CLINICAL THERMOMETER

Application filed June 30, 1931, Serial No. 547,906, and in Japan July 16, 1930.

This invention relates to an improvement in clinical thermometers, characterized by having a liquid-containing bulb with its flat bottom serving as a heat receiver, providing a hollow vacuum heatproof wall at the outer periphery of said bulb and also covering the inner surface of said wall with a mercury coating. The object thereof is to obtain a clinical thermometer easy to handle and applicable to any part of the body and thus able to measure the temperature easily and accurately.

Figure 1:
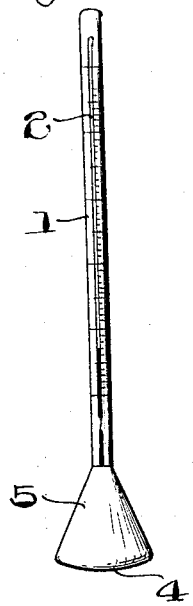
Figure 2:
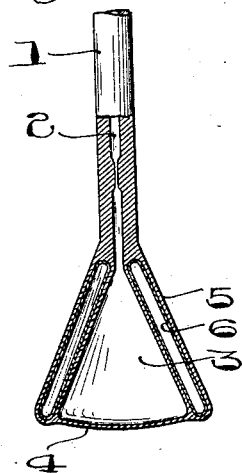

Referring to the accompanying drawing,

Figure 1 is a perspective view of the clinical thermometer according to the present invention and Figure 2, an enlarged sectional view of the liquid-containing bulb and the vacuum heatproof wall provided at its outer periphery.

With the known clinical thermometer, the temperature is measured by putting it under the arm. However, it is not only very difficult, but is apt to be inaccurate for infants, children, and persons seriously ill. According to the present invention which has removed such drawback, a column 2 in the glass stem 1 communicates with a conical liquid-containing bulb 3 which has a flat glass bottom 4 to serve as a heat receiver and which has the outer periphery provided with a hollow vacuum conical heatproof wall 5 constructed integrally with a glass stem 1, the inner surface of said wall 5 being covered with a mercury coating 6.

The thermometer according to this invention need not be put under the arm. Only if the flat bottom 4 of its liquid-containing bulb 3 is applied to any part of the body for suitable time, mercury or alcohol contained in the bulb 3 will be raised in the column 2 by the transmission of the heat received from the body by the bottom 4. Therefore, by reading directly the degree indicated by the mercury column the temperature can be measured as is the case with the known clinical thermometer. The vacuum in the heatproof wall 5 together with the mercury coating 6 serves not only to prevent the fluid in the bulb from undergoing the influence of the heat from outside when the thermometer is applied to the body, but to keep the heat of the contact part of the body from escaping outside owing to the transmission and radiation and thus the temperature felt at the heat receiver 4 suffers no effect and consequently the liquid column can indicate an accurate degree.

Moreover, in this invention, to protect the bulb 3 and the vacuum heatproof wall which covers its outer periphery they may not only be covered with a suitable device, but also it is needless to say that the bulb may be changed into a suitable form without departing from the spirit of the present invention.

I claim:

1. A clinical thermometer, characterized by having a liquid-containing bulb having a flat bottom serving as a heat receiver and providing a hollow vacuum heatproof wall at the outer periphery of the remaining portion of said bulb.

2. A clinical thermometer, characterized by having a liquid-containing bulb having a flat bottom serving as a heat receiver and providing a hollow vacuum heatproof wall at the outer periphery of the remaining portion of said bulb, the inner surface of said vacuum heatproof wall being covered with a mercury coating.

YOZO TSUTSUMI.